US008305625B2

(12) United States Patent  
Kubota et al.

(10) Patent No.: US 8,305,625 B2  
(45) Date of Patent: Nov. 6, 2012

(54) IMAGE FORMING APPARATUS, LOG CONTROL METHOD, AND PROGRAM PRODUCT

(75) Inventors: Takashi Kubota, Kanagawa (JP); Ryosuke Mizunashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 746 days.

(21) Appl. No.: 12/486,108

(22) Filed: Jun. 17, 2009

(65) Prior Publication Data

US 2009/0316200 A1    Dec. 24, 2009

(30) Foreign Application Priority Data

Jun. 19, 2008    (JP) .................. 2008-160670

(51) Int. Cl.
*G06K 15/00*    (2006.01)
*G06F 3/12*    (2006.01)

(52) U.S. Cl. .............. 358/1.16; 358/1.14; 358/1.15

(58) Field of Classification Search .............. 358/1.14, 358/1.15, 1.16
See application file for complete search history.

(56) References Cited

U.S. PATENT DOCUMENTS

2002/0080382 A1*    6/2002    Ohtsu .............. 358/1.14
2006/0193001 A1*    8/2006    Ii .................. 358/1.15
2008/0074683 A1*    3/2008    Yanamura et al. ...... 358/1.2
2008/0112009 A1*    5/2008    Tojo ................ 358/1.15

FOREIGN PATENT DOCUMENTS

JP    2001-273098    10/2001
JP    2006-41764    2/2006

* cited by examiner

*Primary Examiner* — Twyler Haskins
*Assistant Examiner* — Fred Guillermety
(74) *Attorney, Agent, or Firm* — Cooper & Dunham LLP

(57) ABSTRACT

An image forming apparatus for performing functions, includes a storage region configured to store logs of network services that execute the functions, wherein the storage region is divided into plural function segments each corresponding to one of the functions; a managing unit configured to manage the logs in groups formed by grouping together the network services in terms of the corresponding functions; a recording unit configured to record the logs of the network services into each of the function segments in the storage region according to the corresponding functions; and a stopping unit configured to stop the network services in terms of the groups managed by the managing unit, based on storage state information indicating an available space in each of the function segments in the storage region.

10 Claims, 14 Drawing Sheets

FIG.12

| SERVICE GROUP STOPPING INFORMATION | |
|---|---|
| GROUP NAME | STORAGE STATE |
| PRINTER SYSTEM | LOG-FULL |
| MANAGEMENT SYSTEM | NEAR-FULL |
| TRANSMISSION SYSTEM | NEAR-FULL |
| UI SYSTEM | NEAR-FULL |

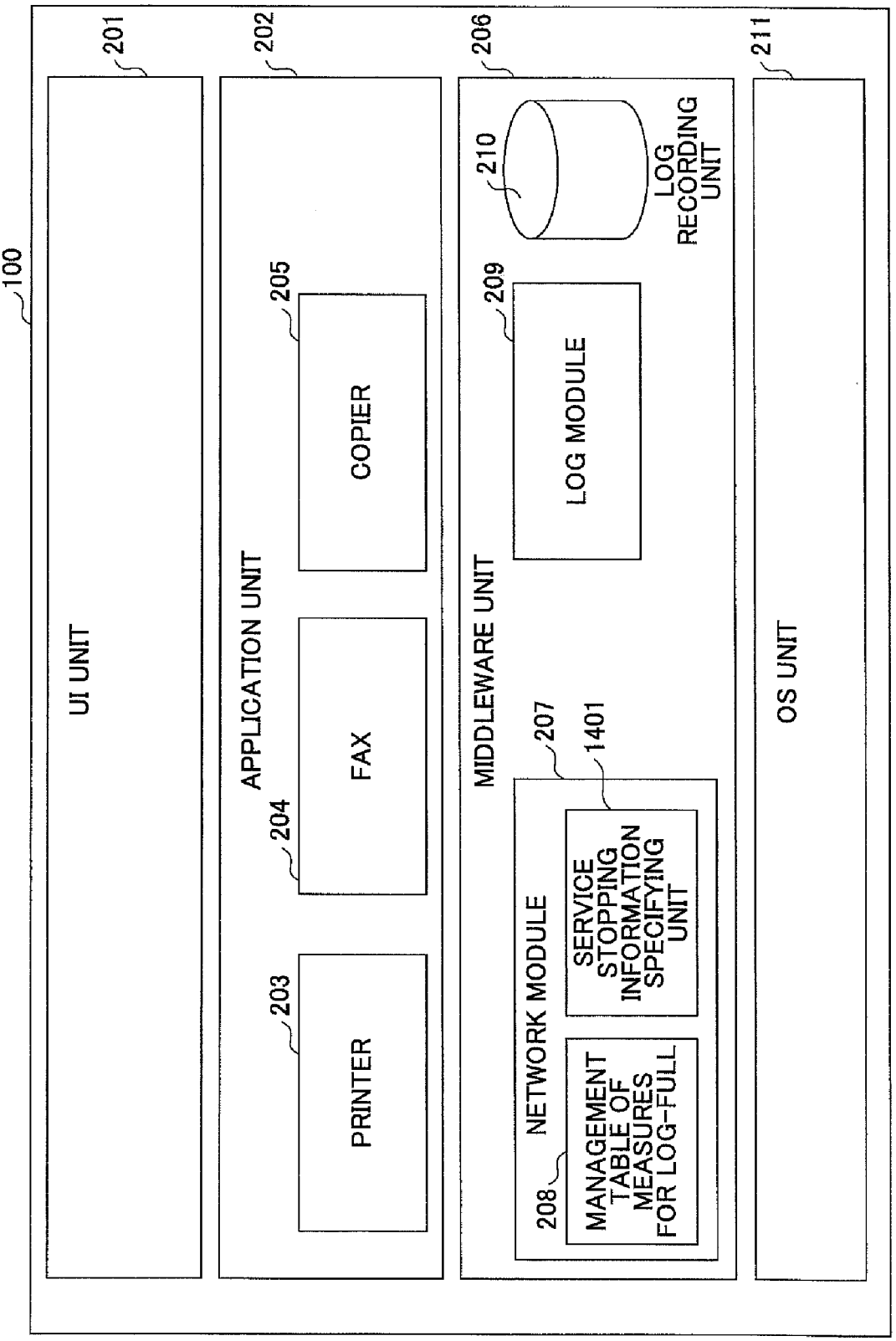

IMAGE FORMING APPARATUS, LOG CONTROL METHOD, AND PROGRAM PRODUCT

BACKGROUND OF THE INVENTION

1. Field of the Invention

The present invention relates to an image forming apparatus, a log control method, and a program product.

2. Description of the Related Art

In recent years, more importance has been placed on accumulating logs (acquiring activity history) in business activities because the Japanese version of the SOX Act (Sarbanes-Oxley Act) will soon be implemented, which is for maintaining the validity of financial reports. Logs are used for the following purposes:

Accountability—for responding to audits

Monitor—check the status of business implementation and detect abnormalities

Respond to accidents—respond to failures, forensic, restoration

Among these, "accountability" is achieved by disclosing activity history in logs, for the purpose of describing that business activities have been valid. Logs can be used as important evidence to prove the validity of past business activities.

Logs are also important in devices such as image forming apparatuses, which are used for the same purposes as those of logs in business activities. Particularly, in terms of "accountability", logs can be used as evidence for proving to the user that the device is appropriately operating. A project for enhancing security assurance in image forming apparatuses is now being developed. This project is for stipulating a requirement of recording the operation history of security-related functions in logs.

Although log functions are important, the storage regions of logs in devices such as image forming apparatuses have limited capacities. Accordingly, the log storage region may become full (log-full state). In a log-full state, obviously no further logs can be recorded. Also, it is not preferable to execute functions without recording logs, in consideration of security. Therefore, in a log-full state, functions should not be executed (functions should be stopped).

Japanese Laid-Open Patent Application No. 2006-41764 (patent document 1) discloses a technology of stopping a new job when a log of the new job cannot be recorded in a log region and logs cannot be deleted from the log region.

In an image forming apparatus that implements functions via a network, the operation history of functions implemented via the network is recorded as logs. Japanese Laid-Open Patent Application No. 2001-273098 (patent document 2) discloses a technology of stopping a function implemented via the network by disabling a protocol, based on the frequency of receiving data according to the protocol.

Patent Document 1: Japanese Laid-Open Patent Application No. 2006-41764

Patent Document 2: Japanese Laid-Open Patent Application No. 2001-273098

However, with the technology disclosed in patent document 1, all of the functions are uniformly stopped, and therefore inconvenience may be caused to the user. Furthermore, with the technology of patent document 2, when there is no more space available in the log storage region, even if a function implemented via the network is stopped based on the frequency of receiving data according to a protocol, inconvenience may be caused to the user.

SUMMARY OF THE INVENTION

The present invention provides an image forming apparatus, a log control method, and a program product, in which one or more of the above-described disadvantages are eliminated.

A preferred embodiment of the present invention provides an image forming apparatus, a log control method, and a program product in which logs can be controlled in consideration of the convenience for the user.

According to an aspect of the present invention, there is provided an image forming apparatus for performing functions, including a storage region configured to store logs of network services that execute the functions, wherein the storage region is divided into plural function segments each corresponding to one of the functions; a managing unit configured to manage the logs in groups formed by grouping together the network services in terms of the corresponding functions; a recording unit configured to record the logs of the network services into each of the function segments in the storage region according to the corresponding functions; and a stopping unit configured to stop the network services in terms of the groups managed by the managing unit, based on storage state information indicating an available space in each of the function segments in the storage region.

According to an aspect of the present invention, there is provided an image forming apparatus for performing functions, wherein the functions include a predetermined function that is executed together with the other functions, the image forming apparatus including a storage region configured to store logs of network services that execute the functions, wherein the storage region is divided into plural function segments each corresponding to one of the functions; a managing unit configured to manage the logs in groups formed by grouping together the network services in terms of the corresponding functions; a recording unit configured to record the logs of the network services into each of the function segments in the storage region according to the corresponding functions; and a stopping unit configured to stop the network services in terms of the groups managed by the managing unit, based on storage state information indicating an available space in the function segment corresponding to the predetermined function in the storage region.

According to an aspect of the present invention, there is provided a log control method of an image forming apparatus for performing functions, the image forming apparatus including a storage region configured to store logs of network services that execute the functions, wherein the storage region is divided into plural function segments each corresponding to one of the functions, and a managing unit configured to manage the logs in groups formed by grouping together the network services in terms of the corresponding functions, the log control method including a recording step of recording the logs of the network services into each of the function segments in the storage region according to the corresponding functions; and a stopping step of stopping the network services in terms of the groups managed by the managing unit, based on storage state information indicating an available space in each of the function segments in the storage region.

According to one embodiment of the present invention, an image forming apparatus, a log control method, and a program product are provided, in which logs can be controlled in consideration of the convenience for the user.

BRIEF DESCRIPTION OF THE DRAWINGS

Other objects, features and advantages of the present invention will become more apparent from the following detailed description when read in conjunction with the accompanying drawings, in which:

FIG. 12 is a diagram of an example of service group stopping information;

FIG. 14 is a block diagram of a main functional configuration of an image forming apparatus according to the second modification.

DETAILED DESCRIPTION OF THE PREFERRED EMBODIMENTS

A description is given, with reference to the accompanying drawings, of embodiments of the present invention.

First Embodiment

<Hardware Configuration of Image Forming Apparatus>

Figure 1:
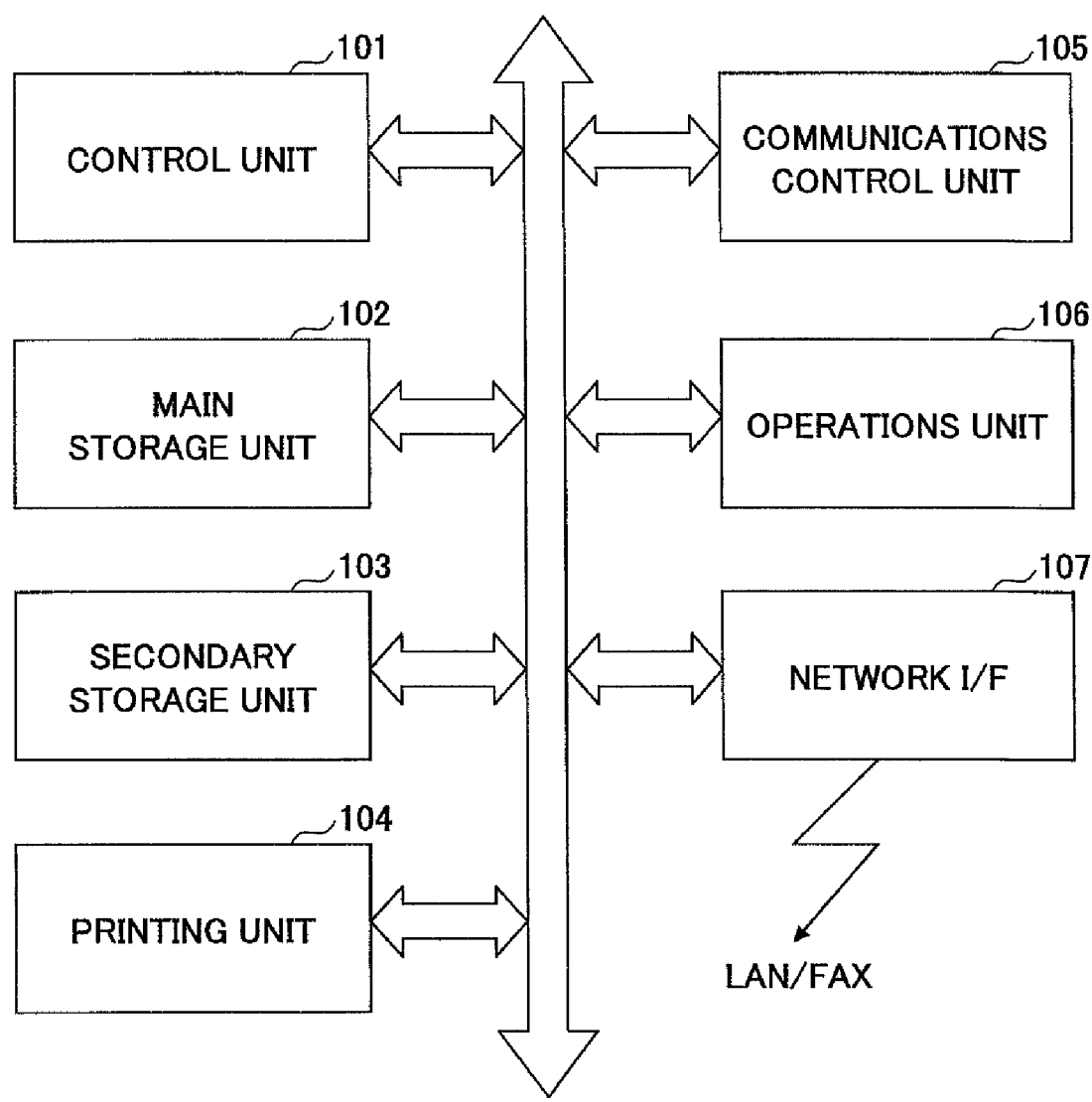
FIG. 1 illustrates the main hardware configuration of an image forming apparatus according to a first embodiment.

A description is given of the main hardware configuration of an image forming apparatus according to a first embodiment of the present invention. FIG. 1 illustrates the main hardware configuration of an image forming apparatus according to the first embodiment. An image forming apparatus 100 shown in FIG. 1 includes a control unit 101, a main storage unit 102, a secondary storage unit 103, a printing unit 104, a communications control unit 105, an operations unit 106, and a network I/F 107.

The control unit 101 is a CPU for controlling respective units and performing calculation and processing on data, in the image forming apparatus. The control unit 101 is a computing unit for executing programs stored in the main storage unit 102. The control unit 101 receives data from an input device or a storage device, performs calculation and processing on the data, and outputs the resultant data to an output device or a storage device.

The main storage unit 102 is, for example, a ROM (Read Only Memory) or a RAM (Random Access Memory), for storing or temporarily saving programs and data of the OS (operating system), which is the basic software executed by the control unit 101, and application software.

The secondary storage unit 103 is, for example, a HD (Hard Disk), for storing data related to application software. The secondary storage unit 103 stores various information (for example, user information) managed by the image forming device, which is managed by functions such as a DataBase (DB) and a File System (FS).

The printing unit 104 receives image data, and outputs (prints) the received image data onto a transfer sheet (printing sheet) with a laser printing unit by using laser beams or with a thermal printing unit that prints an image onto a dedicated sheet by heat.

The communications control unit 105 controls communications in coordination with the control unit 101, for LAN connection and fax communications. The operations unit 106 is constituted by an LCD, a switch, a lamp, an LED, or a key, for displaying the state of the image forming apparatus or warnings.

The network I/F 107 is an interface between the image forming apparatus and peripheral devices having communications functions connected via a network such as a LAN (Local Area Network) that is constructed by wired and/or wireless data transmission lines, a WAN (Wide Area Network), or a FAX network.

<Main Functional Configuration of Image Forming Apparatus>

Figure 2:
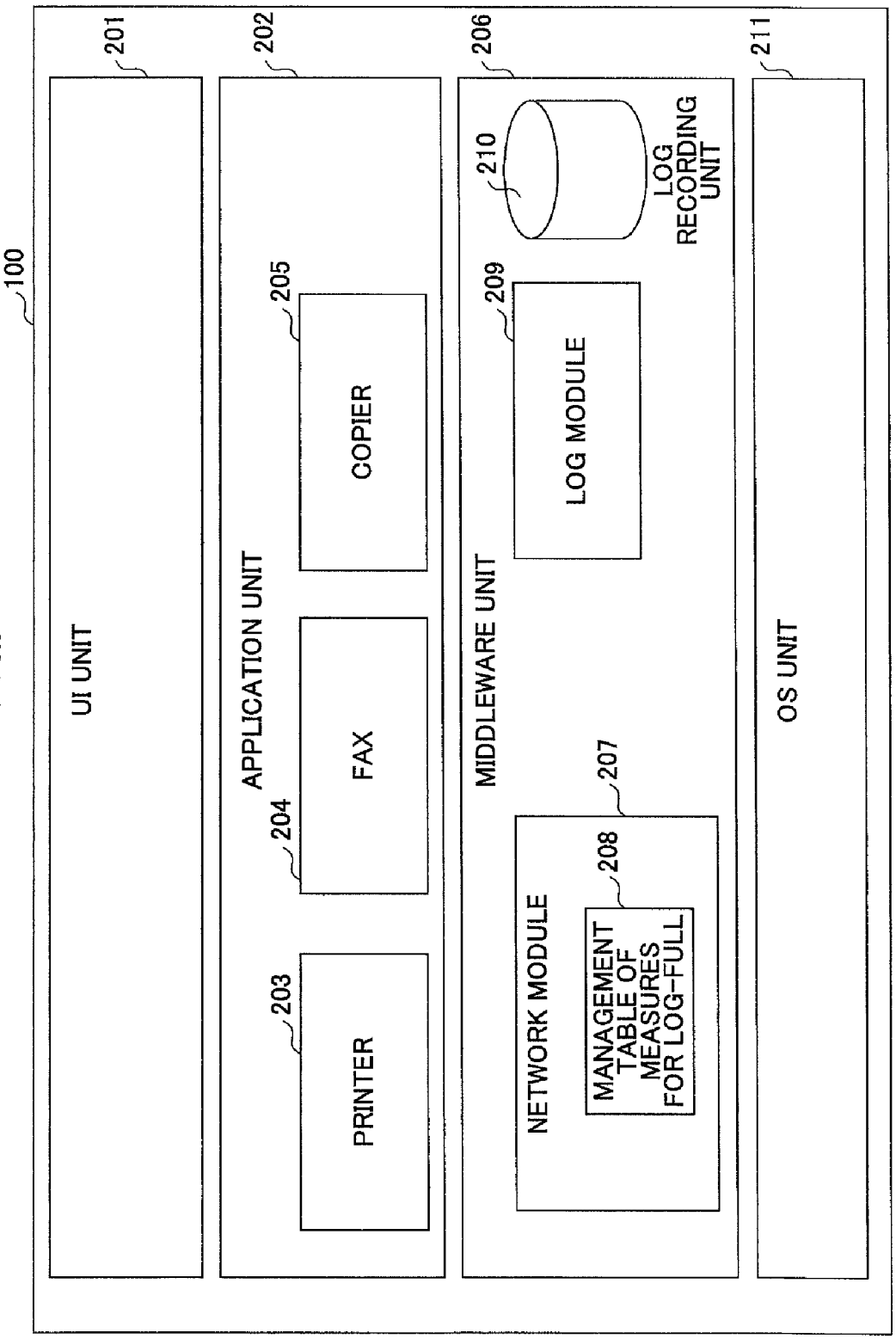
FIG. 2 is a block diagram of the main functional configuration of the image forming apparatus according to the first embodiment.

A description is given of a main functional configuration of the image forming apparatus according to the first embodiment. FIG. 2 is a block diagram of the main functional configuration of the image forming apparatus according to the first embodiment. As shown in FIG. 2, the image forming apparatus 100 includes a UI unit 201, an application unit 202, a middleware unit 206, and an OS unit 211.

The UI unit 201 is a module that acts as a UI (User Interface) function for receiving requests for executing applications (for example, copy, fax, scan, and print).

The application unit 202 is a module for executing applications such as a printer 203, a fax 204, and a copier 205.

The middleware unit 206 includes a network module 207, a log module 209, and a log recording unit 210. The network module 207 has a function of implementing various network services, and executes this function in response to a request from the application unit 202.

The network module 207 includes a management table 208 described below. The management table 208 stores information indicating which network service or which network service group is to be stopped when each log storage region is in a log-full state or in a near-full state, and the type of measure to be taken to stop a service.

Log-full means a state where the entire storage region used for writing in logs has been filled, and no further logs can be written into the storage region. Near-full means a state where the proportion of the storage region including recorded logs is greater than or equal to a predetermined value.

The log module 209 records logs in the log recording unit 210 (for example, a hard disk), in response to a request from the application unit 202 or the middleware unit 206. While recording logs, the log module 209 confirms the available space in the log storage region and sends a pertinent notification to other modules in a log-full state or a near-full state (the user may specify the standard of near-full).

In the first embodiment, notifications are given only in a log-full state or a near-full state. However, a notification may be given for any other state. For example, there may be plural near-full states such as near-full 1, where greater than or equal to 60% of the storage region has been filled, and near-full 2, where greater than or equal to 80% of the storage region has been filled. In this manner, notifications can be given for more detailed levels, so that the operation of recording logs can be controlled more flexibly.

The log recording unit 210 is, for example, a hard disk. The log module 209 writes logs into the log recording unit 210, and the log recording unit 210 stores the written-in logs. The OS unit 211 controls the image forming apparatus to which it belongs.

<Main Functional Configuration of Middleware Unit>

Figure 3:
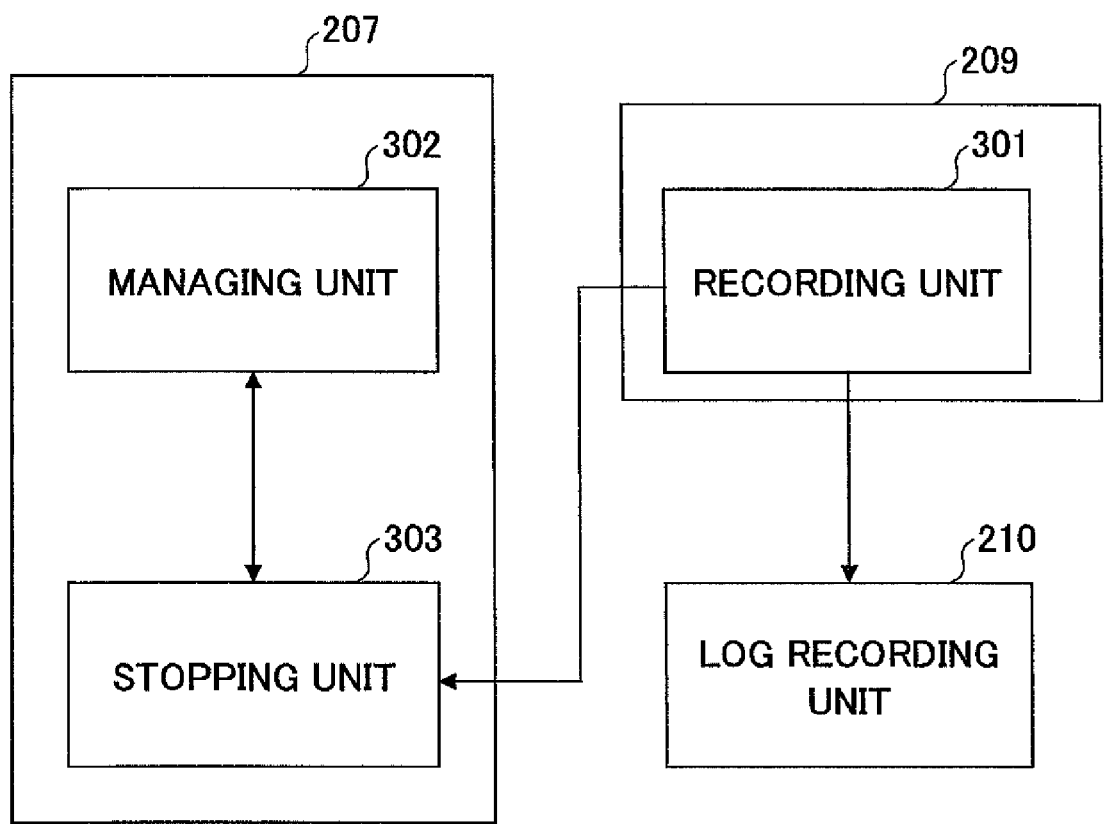
FIG. 3 is a block diagram of the main functional configuration of a middleware unit.

Next, a detailed description is given of the middleware unit 206. FIG. 3 is a block diagram of the main functional configuration of the middleware unit 206. In FIG. 3, elements corresponding to those in FIG. 2 are denoted by the same reference numbers, and are not further described.

The log module 209 includes a recording unit 301. The recording unit 301 writes in a log of an executed network service into a log storage region of the function corresponding to the particular network service. The log module 209 confirms the available space in the log storage region, and outputs, to a stopping unit 303, storage state information indicating the availability in the storage region. In the present embodiment, in the log-full state and the near-full state, information indicating such a state is output to the stopping unit 303 as storage state information.

The network module 207 includes a managing unit 302 and the stopping unit 303. The managing unit 302 saves a management table 208, which is a table of association between network services and applications (functions). The stopping unit 303 refers to the management table 208 according to need.

When storage state information of the log recording unit 210 is acquired from the recording unit 301, the stopping unit 303 refers to the management table 208 managed by the managing unit 302, and determines what kind of process is to be performed.

Figure 4:
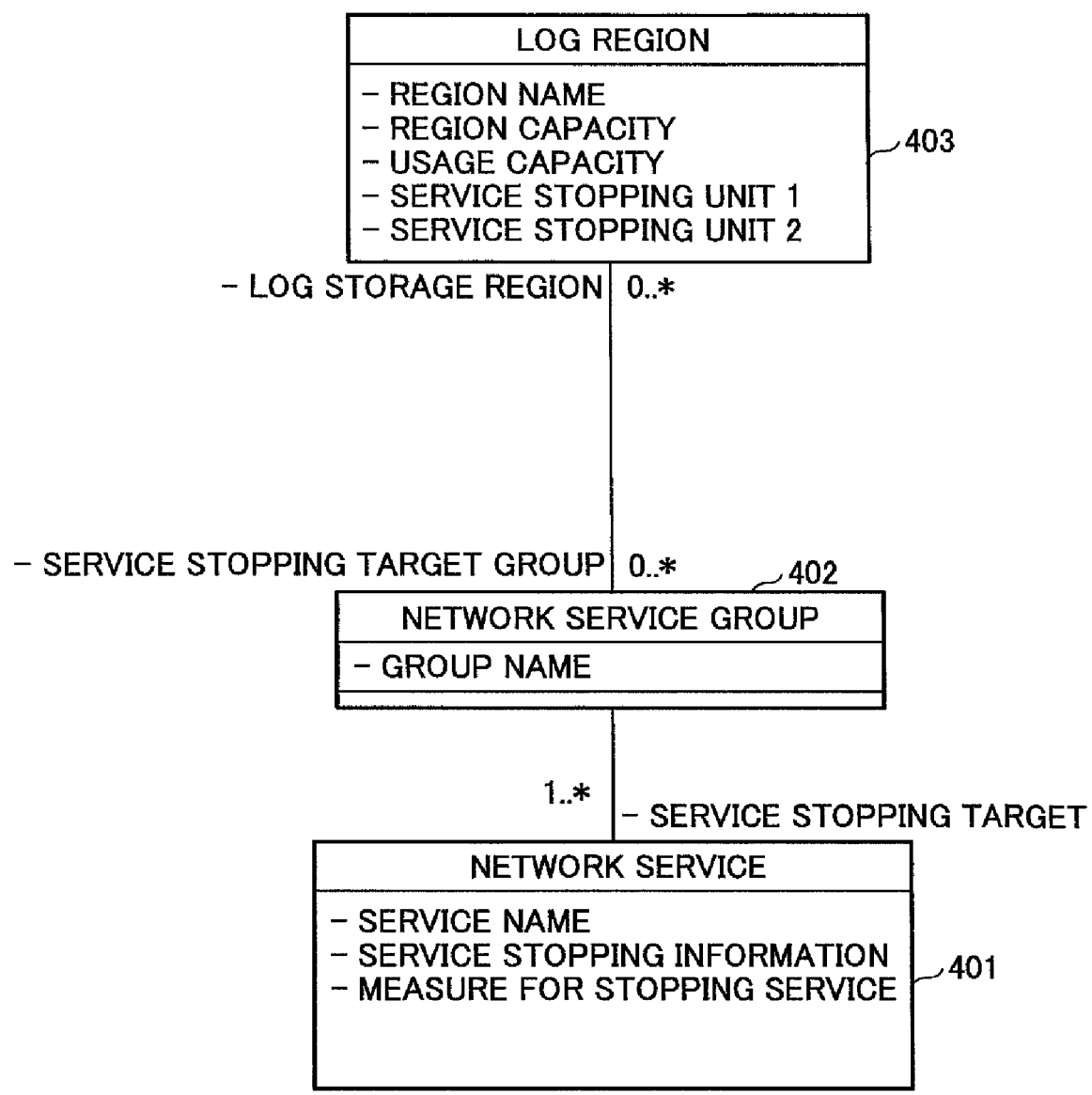
FIG. 4 is a class diagram indicating information held by a management table.

FIG. 4 is a class diagram indicating the information held by the management table. As shown in FIG. 4, the management table 208 holds information items of a network service 401, a network service group 402, and a log storage region 403, in association with each other.

The network service 401 stores information items such as a service name, service stopping information, and a measure for stopping the service. The service name is information used for identifying a network service. The service stopping information indicates the state of the log storage region at which the service is to be stopped. The measure for stopping the service is information indicating the type of process to be performed to stop a service. Examples of the measure for stopping service are standby and disable.

The network service group 402 stores information indicating a group name. The log storage region 403 stores information items of a region name, region capacity, usage capacity, and service stopping units 1 and 2. A service stopping unit indicates the units in which the service is to be stopped.

Figure 5:
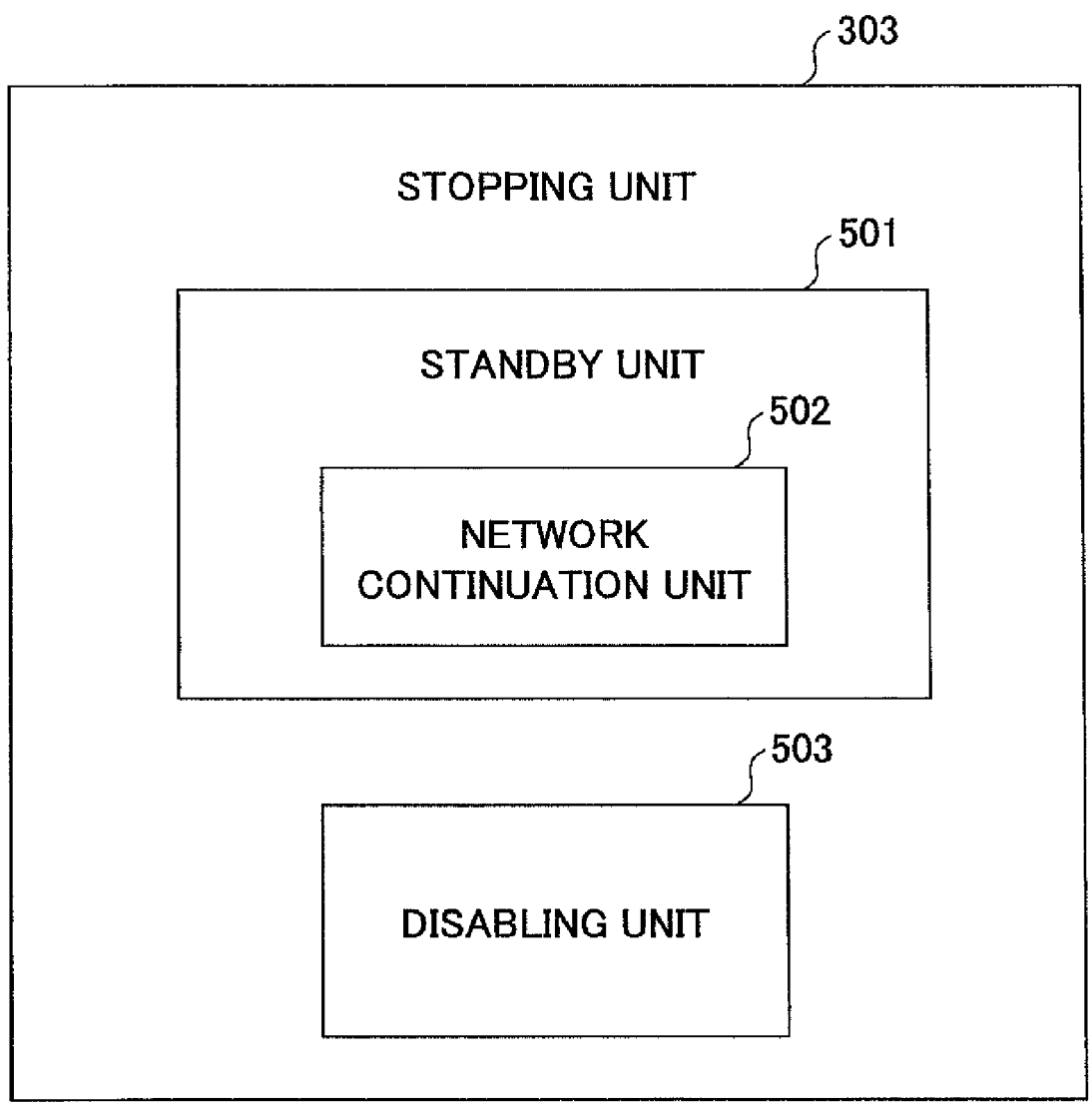
FIG. 5 is a block diagram of a detailed functional configuration of a stopping unit.

Next, a description is given of a process performed by the stopping unit 303 to stop a network service, with the use of information stored in the management table 208. FIG. 5 is a block diagram of a detailed functional configuration of the stopping unit 303.

The stopping unit 303 includes a standby unit 501 and a disabling unit 503. Based on the acquired storage state information, the stopping unit 303 determines which service to stop with the use of the information in the management table 208.

When the stopping unit 303 has determined which service to stop, the stopping unit 303 determines what process is to be performed to stop the service based on the information stored in the management table 208. In the present embodiment, the standby unit 501 performs a standby process to make the process stand by, and the disabling unit 503 performs a disabling process to disable the process.

The standby unit 501 stops sending, to the application unit 202, function requests corresponding to packets that have been received, and uses a network component to temporarily store, in a memory, a notification indicating that packets have been received. The standby unit 501 executes a function when an appropriate job environment has been established (resumes the job).

The standby unit 501 includes a network continuation unit 502. The network continuation unit 502 executes "keep-alive" (have packets constantly sent) to maintain a session of a network service, when a protocol uniquely requires the network service to maintain a session with a communication destination.

For example, assuming that a printing operation is performed for print data that is received from a PC (personal computer), and the log becomes full during the printing operation but print data is still remaining in the PC, the session needs to be maintained to receive the print data remaining in the PC after the function is resumed.

When the standby unit 501 is executed, the user may select whether to cancel the function or to call the administrator and read out the logs. When the user has selected to call the administrator and read out the logs, a standby process is performed until the logs start to be read out.

The disabling unit 503 closes a network communications port, or stops receiving packets of the target service with a firewall, in order to disable a network service. The disabling unit 503 may be executed for network services performed among devices, and the standby unit 501 may be executed for user-related (job-related) network service.

Figure 6:
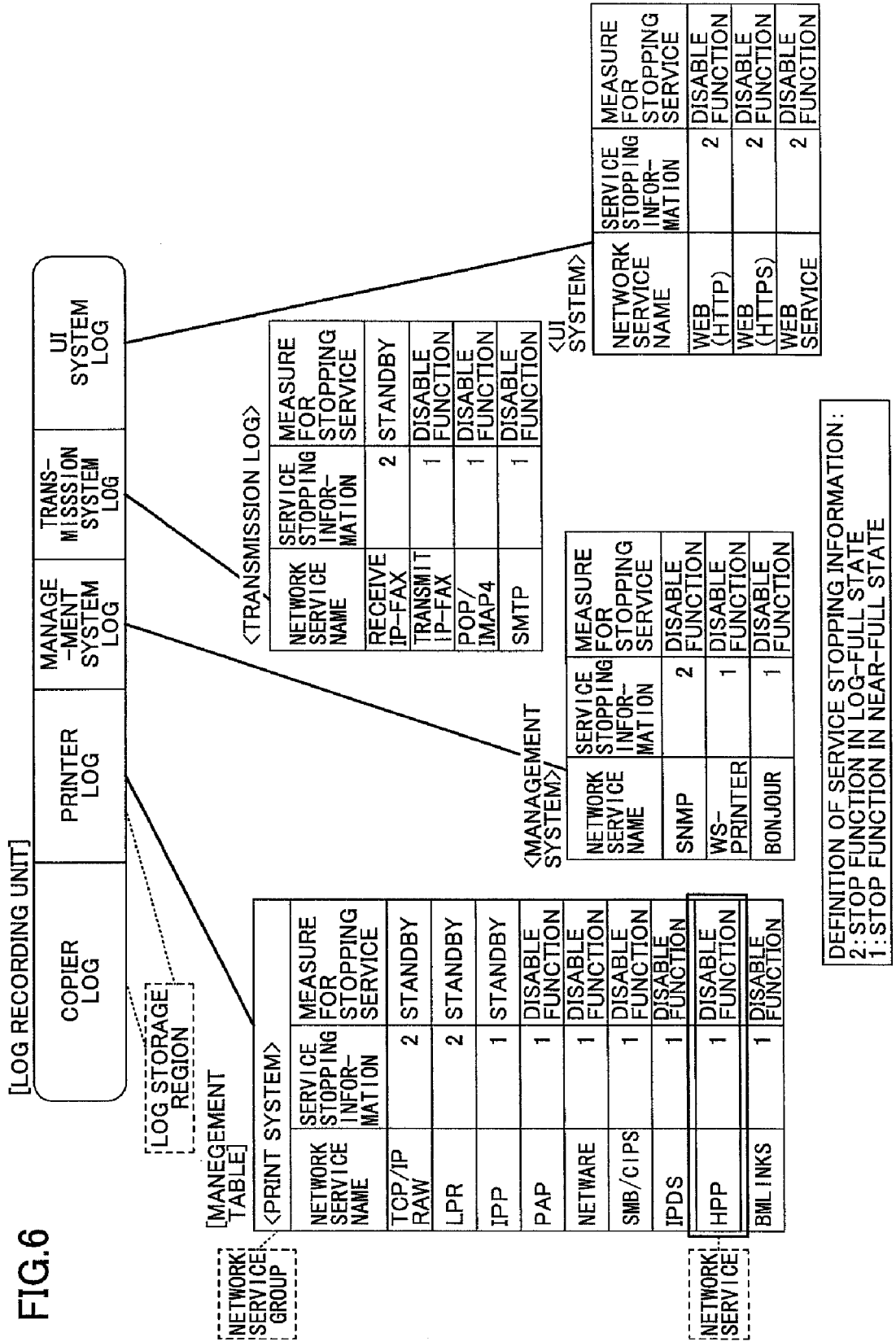
FIG. 6 illustrates the relationship between a log storage region and the management table according to the first embodiment.

A description is given of a specific example of the management table 208 and the relationship between the management table 208 and the storage region. FIG. 6 illustrates the relationship between the log storage region and the management table 208 according to the first embodiment. As shown in FIG. 6, the log storage region is divided into a copier log, a printer log, a management system log, a transmission system log, and a UI system log, in accordance with the respective functions.

The management table divides the network services into groups in accordance with the respective functions, and stores information corresponding to the network service name, the service stopping information, and the measure for stopping the service, for each of the groups. For example, in a print system management table, a network service name "TCP/IPraw", service stopping information "2", and the measure for stopping the service "standby" are stored in association with each other.

The "TCP/IPraw" means the "standard TCP/IP port monitor" of Windows (registered trademark). As to the service stopping information, "2" means to stop the function in a log-full state, and "1" means to stop the function in a near-full state. Furthermore, the service stopping information and the measure for stopping the service are specified separately.

<Process for Recording Log>

Figure 7:
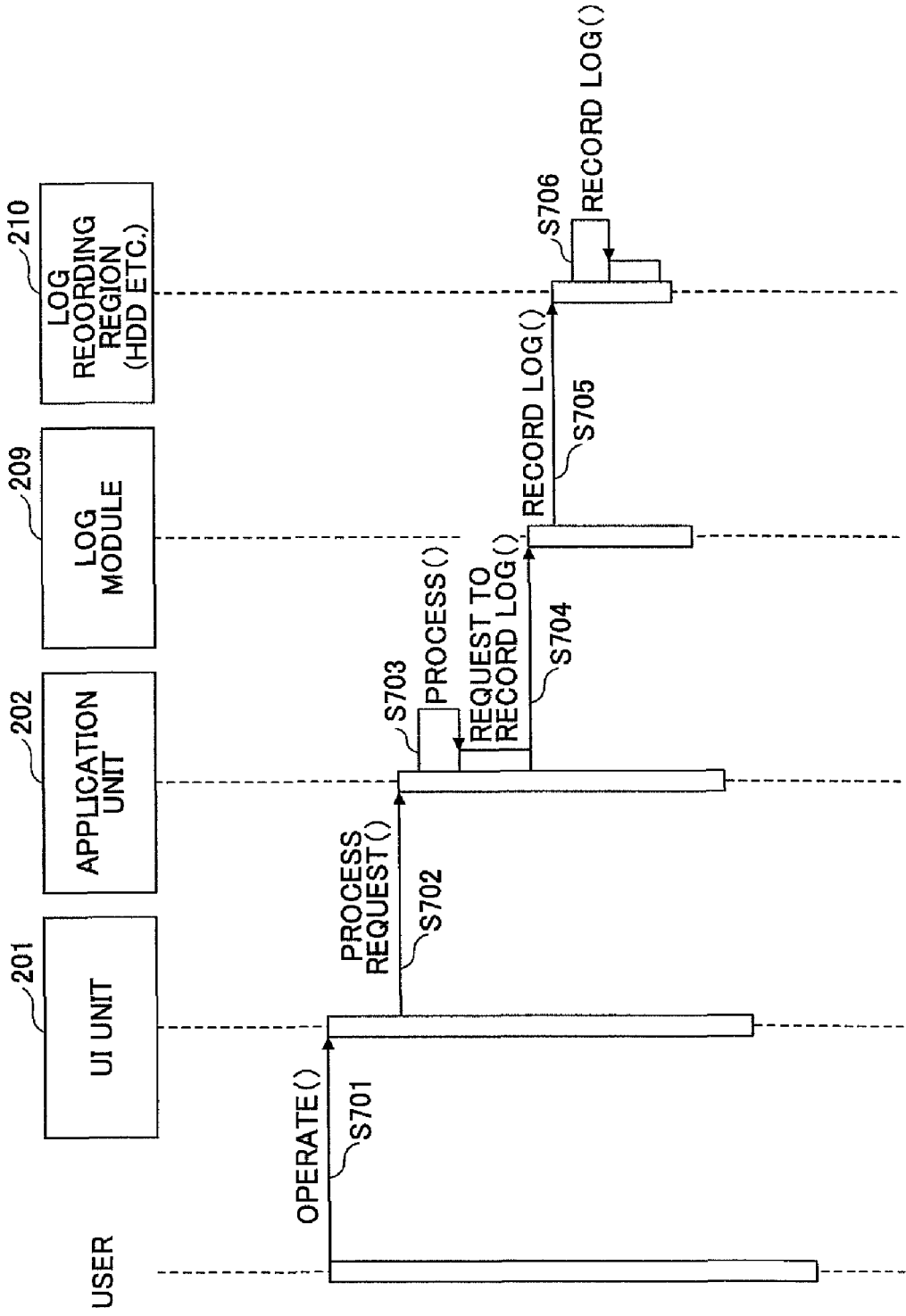
FIG. 7 is a sequence diagram illustrating the process for recording logs in the image forming apparatus according to the first embodiment.

FIG. 7 is a sequence diagram illustrating the process for recording logs in the image forming apparatus according to the first embodiment. In step S701, the user operates the UI unit 201 for executing a function. After step S701, the process proceeds to step S702, where the UI unit 201 sends a process request to the application unit 202.

After step S702, the process proceeds to step S703, where the application unit 202 performs the requested process. After step S703, the process proceeds to step S704, where the application unit 202 requests the log module 209 to record a log in the log recording unit 210.

After step S704, the process proceeds to step S705, where the log module 209, which has received the log recording request, records the log in the log recording unit 210. The log module 209 records the log into a storage region corresponding to the function of the log to be recorded. After step S705, the process proceeds to step S706, where the log recording unit 210 holds the log recorded by the log module 209.

<Function Stopping Process in Log-Full State>

Figure 8:
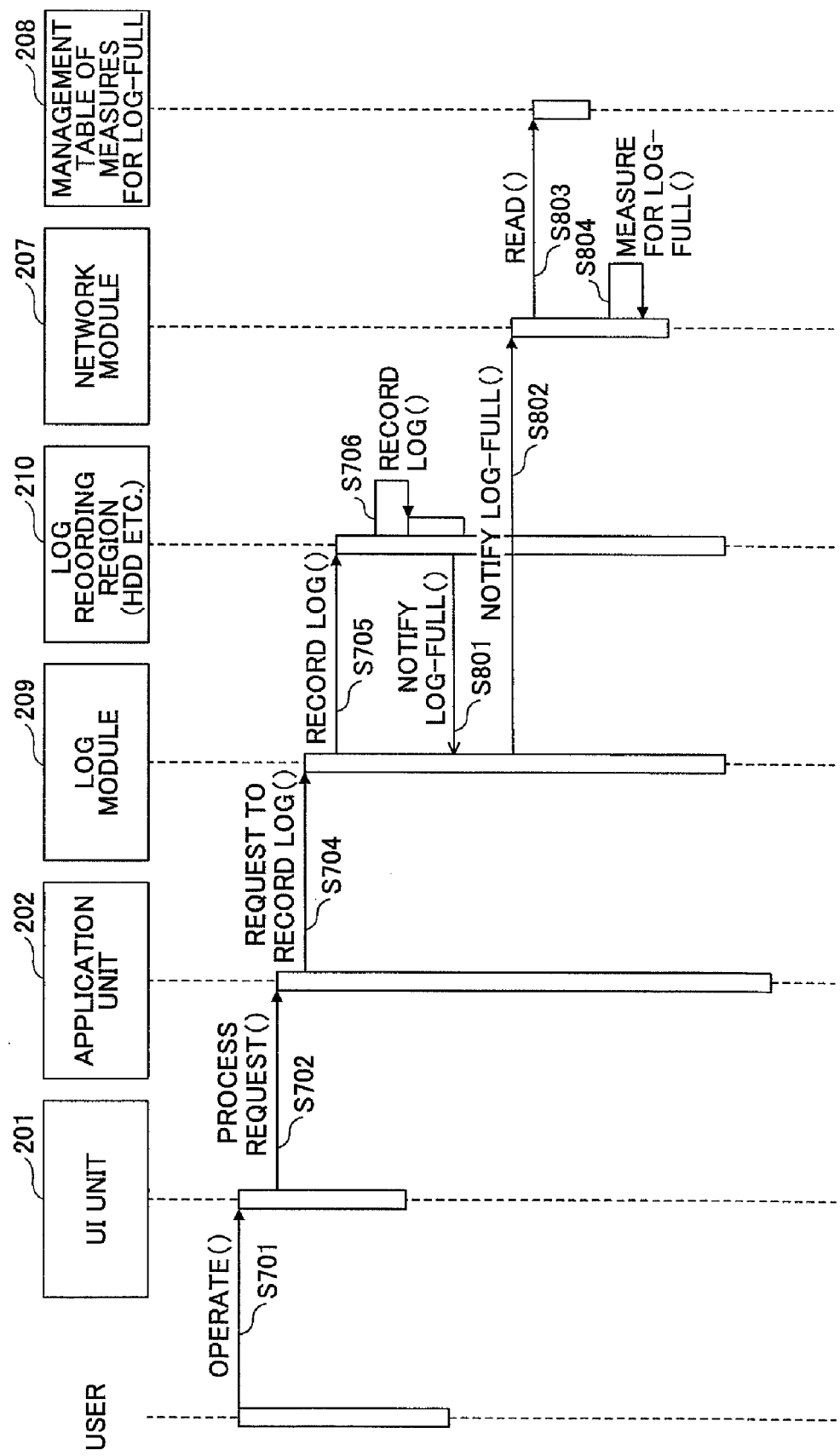
FIG. 8 is a sequence diagram illustrating a function stopping process in a log-full state in the image forming apparatus according to the first embodiment.

FIG. 8 is a sequence diagram illustrating the function stopping process in a log-full state in the image forming apparatus according to the first embodiment. In the process shown in FIG. 8, process steps corresponding to those in FIG. 7 are denoted by the step numbers, and are not further described.

In step S801, when the log storage region has become full (no further logs can be recorded), the log recording unit 210 sends a notification indicating the log-full state to the log module 209. After step S801, the process proceeds to step S802, where the log module 209 sends a notification indicating the log-full state to the network module 207.

After step S802, the process proceeds to step S803, where the network module 207 reads the management table 208. After step S803, the process proceeds to step S804, where the network module 207 performs a standby process or a disabling process as the measure for the log-full state, based on the information indicating the measure for stopping the service included in the management table 208.

In FIG. 8, a process for a log-full state is described; however, in steps S801 and S802, the notifications may indicate a near-full state, and a measure for a near-full state may be performed in step S804.

As described above, notifications may be given for states of logs other than the log-full state. The network component determines the measure (standby process or disabling process) based on the management table for each of the notifications. When the network service that is the target to be stopped is not included in the management table, the aforementioned measure is not taken.

<Process of Cancelling Log-Full State>

Figure 9:
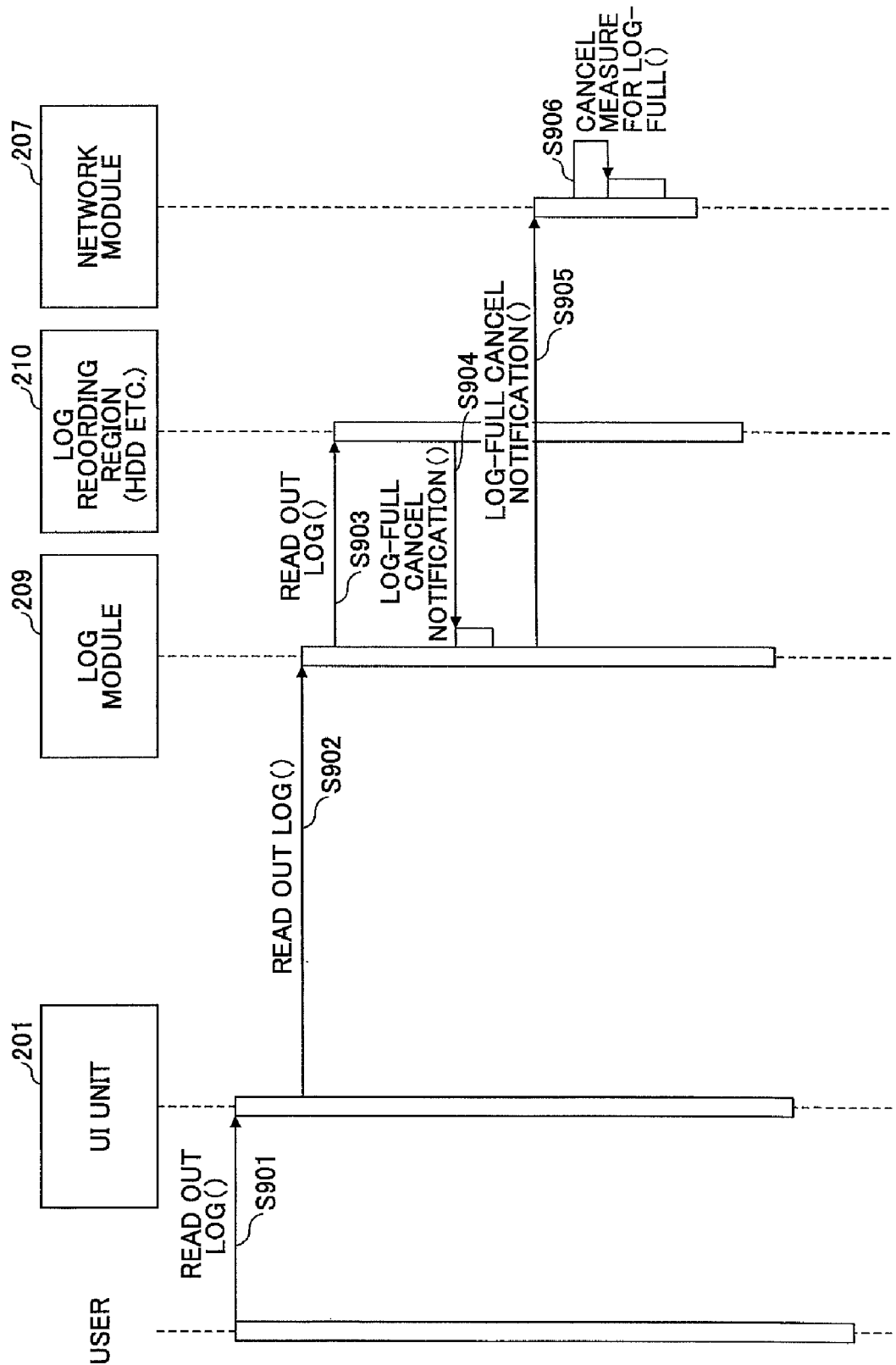
FIG. 9 is a sequence diagram illustrating a process for cancelling a log-full state in the image forming apparatus according to the first embodiment.

FIG. 9 is a sequence diagram illustrating a process for cancelling a log-full state in the image forming apparatus according to the first embodiment. By performing the process shown in FIG. 9, the logs in the storage region which have reached a log-full state are read out so that space is made available in the storage region. Accordingly, the function that has been stopped due to the log-full state can be resumed (cancel log-full state).

In step S901, the user (administrator) operates the UI unit 201 for reading out the log. After step S901, the process proceeds to step S902, where the UI unit 201 instructs the log module 209 to read out the logs.

After step S902, the process proceeds to step S903, where the log module 209 reads out, from the log recording unit 210, the logs specified by the user (administrator). After step S903, the process proceeds to step S904, where the log recording unit 210 sends a notification indicating that the log-full state has been cancelled, to the log module 209.

After step S904, the process proceeds to step S905, where the log module 209 sends a notification indicating that the log-full state has been cancelled, to the network module 207. After step S905, the process proceeds to step S906, where the network module 207 resumes the function that has been stopped due to the log-full state, so that the function can be executed once again.

<Service Stopping Process in First Embodiment>

Figure 10:
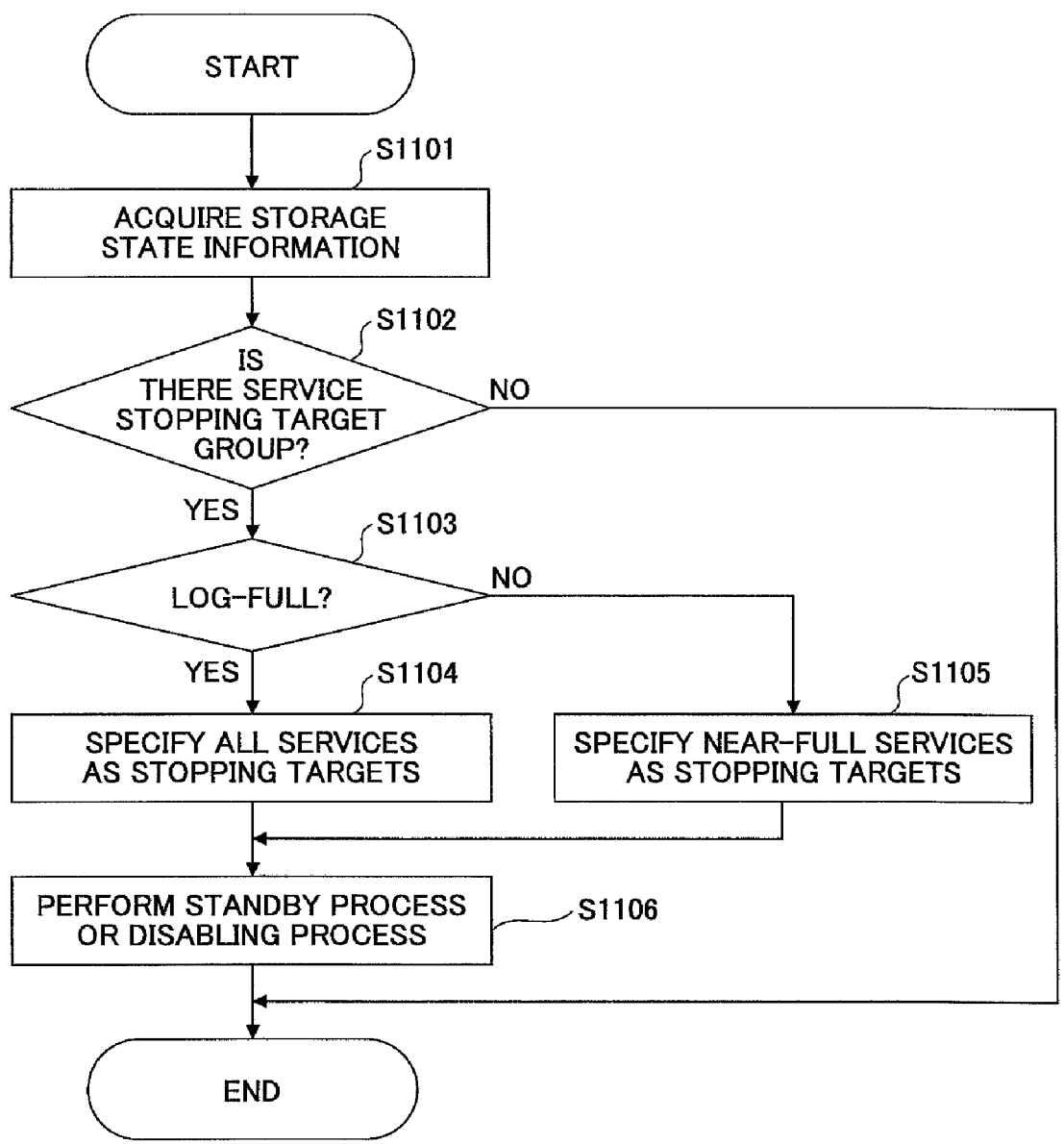
FIG. 10 is a flowchart indicating a service stopping process according to the first embodiment.

FIG. 10 is a flowchart indicating the service stopping process according to the first embodiment. In step S1101, the stopping unit 303 of the network module 207 acquires storage state information (information indicating log-full or near-full) from the log module 209.

After step S1101, the process proceeds to step S1102, where the stopping unit 303 determines, based on the management table, whether there is a service stopping target group corresponding to the notification destination (log storage region) of the acquired storage state information.

More specifically, the stopping unit 303 determines whether the network service group corresponding to the notified log storage region is stored in the management table. When the service stopping target group is stored in the management table, the process proceeds to step S1103, and when the service stopping target group is not stored in the management table, the process ends.

In step S1103, the stopping unit 303 determines whether the acquired storage state information is indicating a log-full state. When the information is indicating a log-full state, the process proceeds to step S1104, and when the information is not indicating a log-full state, the process proceeds to step S1105.

In step S1104, the stopping unit 303 specifies, as the stopping targets, all of the network services stored in the management table corresponding to the notification destination of the acquired storage state information. For example, when the notification destination of the acquired storage state information is the log storage region for the printer, all of the network services stored in the print system management table are specified as stopping targets. When there is a network service that has already been stopped, the corresponding network service is excluded from the stopping targets.

In step S1105, among the network services stored in the management table corresponding to the notification destination of the acquired storage state information, the network services having a service stopping information item indicating "1" (meaning near-full), are specified as the stopping target by the stopping unit 303.

After step S1104 or step S1105, the process proceeds to step S1106, where the stopping unit 303 performs a standby process or a disabling process for the network service that has been specified as the stopping target, based on the information indicating the measure for stopping the service stored in the management table.

In the standby process, there may be cases where the network continuation unit 502 performs a process for maintaining a session as described above. A description is given of a protocol for executing keep-alive to maintain a session.

In a TCP/IP protocol, the keep-alive function is already provided as a specification of the TCP. If the session can be maintained at the TCP level, the standby can be performed. Meanwhile, in the LPR protocol, the timeout of the port is fixed at four minutes. Therefore, if communications are not performed for four minutes, session timeout occurs. Accordingly, the session needs to be subsequently maintained by an LPR protocol process.

As described above, in the case of the LPR protocol process, the network continuation unit 502 needs to uniquely maintain a session by an LPR protocol process. Specifically, it is necessary to consider a mechanism for maintaining the session for each kind of protocol, and when the session needs to be uniquely maintained according to a protocol, the network continuation unit 502 is used to maintain the session.

In the process shown in FIG. 10, a service is stopped by each network service. However, the service may be stopped by each network service group stored in the management table. For example, when the log storage region of the printer shown in FIG. 6 becomes log-full, a process may be performed to stop all of the services in the network service group (ranging from TCP/IPraw to BMLinkS) stored in the print system management table.

In this manner, the services can be stopped in units of groups in the management tables corresponding to the respective functions. When the services are stopped in units of groups, a disabling process may be uniformly performed on all of the services in a group. Accordingly, the stopping process can be facilitated.

According to the image forming apparatus according to the first embodiment, the logs can be controlled in consideration of the user's convenience, by referring to management tables corresponding to the respective functions, when the long storage region is in a log-full state or a near-full state. Furthermore, different processes can be performed to stop the network service, in accordance with the process contents of the network service; for example, a standby process or a disabling process may be performed as a measure for stopping the service.

Furthermore, when performing a standby process, even when timeout occurs with the applied protocol, keep-alive may be uniquely executed according to the protocol, and therefore the standby process can be reliably performed for the respective protocols. Furthermore, by performing a service stopping process at a log-full state and a near-full state, the service can be stopped in a stepwise manner.

(First Modification)

A description is given of an image forming apparatus according to a first modification. In the first modification, there is a function that is executed together with another function. When there is no more space in the log storage region corresponding to this function, a network service group corresponding to the other function is stopped.

Figure 11:
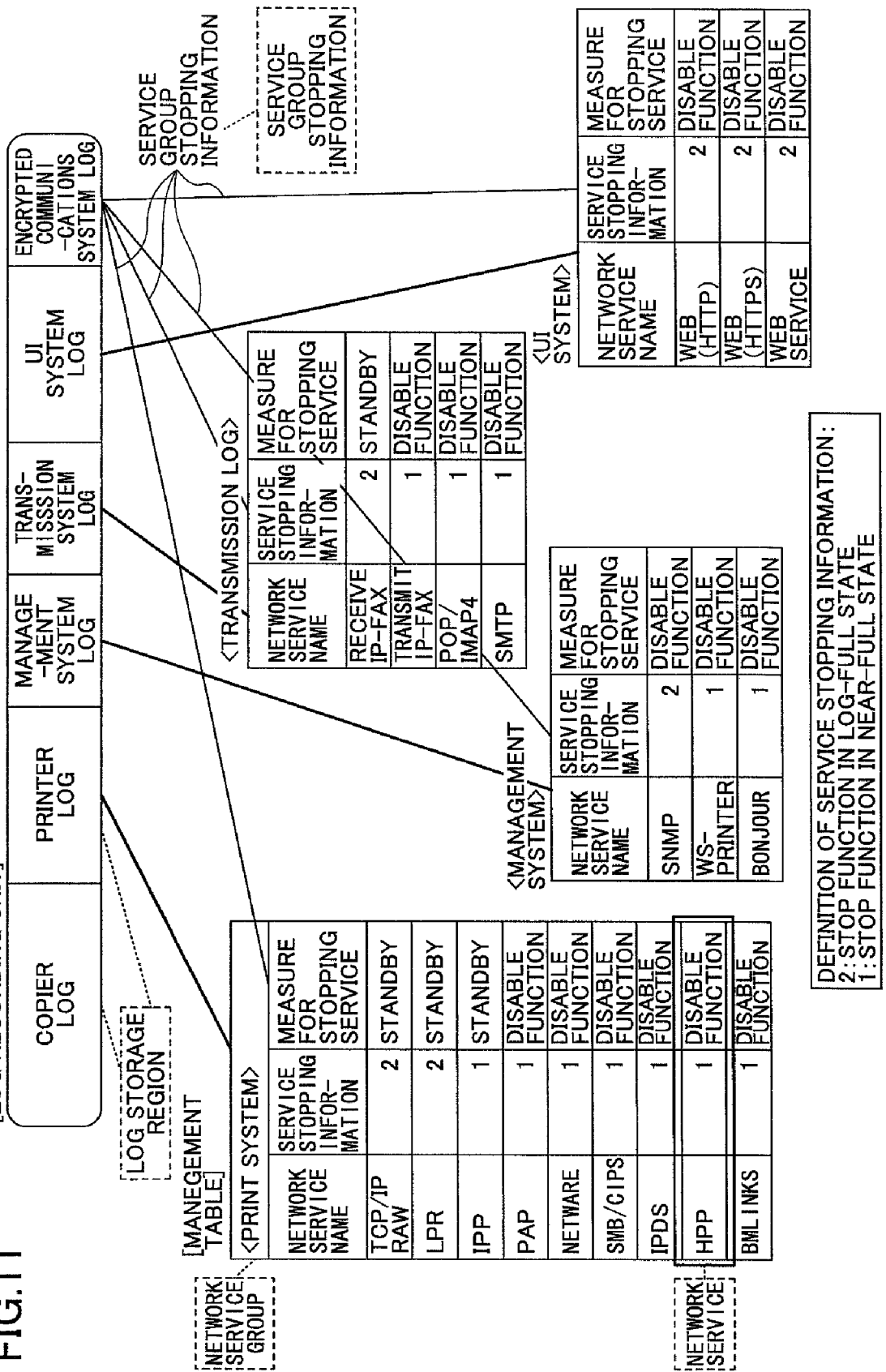
FIG. 11 illustrates the relationship between a log storage region and the management table according to a first modification.

With reference to FIG. 11, a description is given of a service stopping process according to the first modification. The difference between FIG. 6 and FIG. 11 is that in FIG. 11, an encrypted communications system log is included in the log storage region.

The encrypted communications system log is stored when each function is encrypted and executed. For example, when a transmission system is encrypted and executed, a log is written in both the transmission system log and the encrypted communications system log.

When a storage region of the encrypted communications system log has become near-full or log-full, the stopping unit refers to the service group stopping information to determine which network service group of a function is be stopped. The service group stopping information indicates the storage state (log-full or near-full) when the service is to be stopped, for each network service group.

FIG. 12 is a diagram of an example of service group stopping information. As shown in FIG. 12, for the print system group, the service is stopped when the storage region of the encrypted communications system log is in a log-full state; and for the management system group, the service is stopped when the storage region of the encrypted communications system log is in a near-full state.

Figure 13:
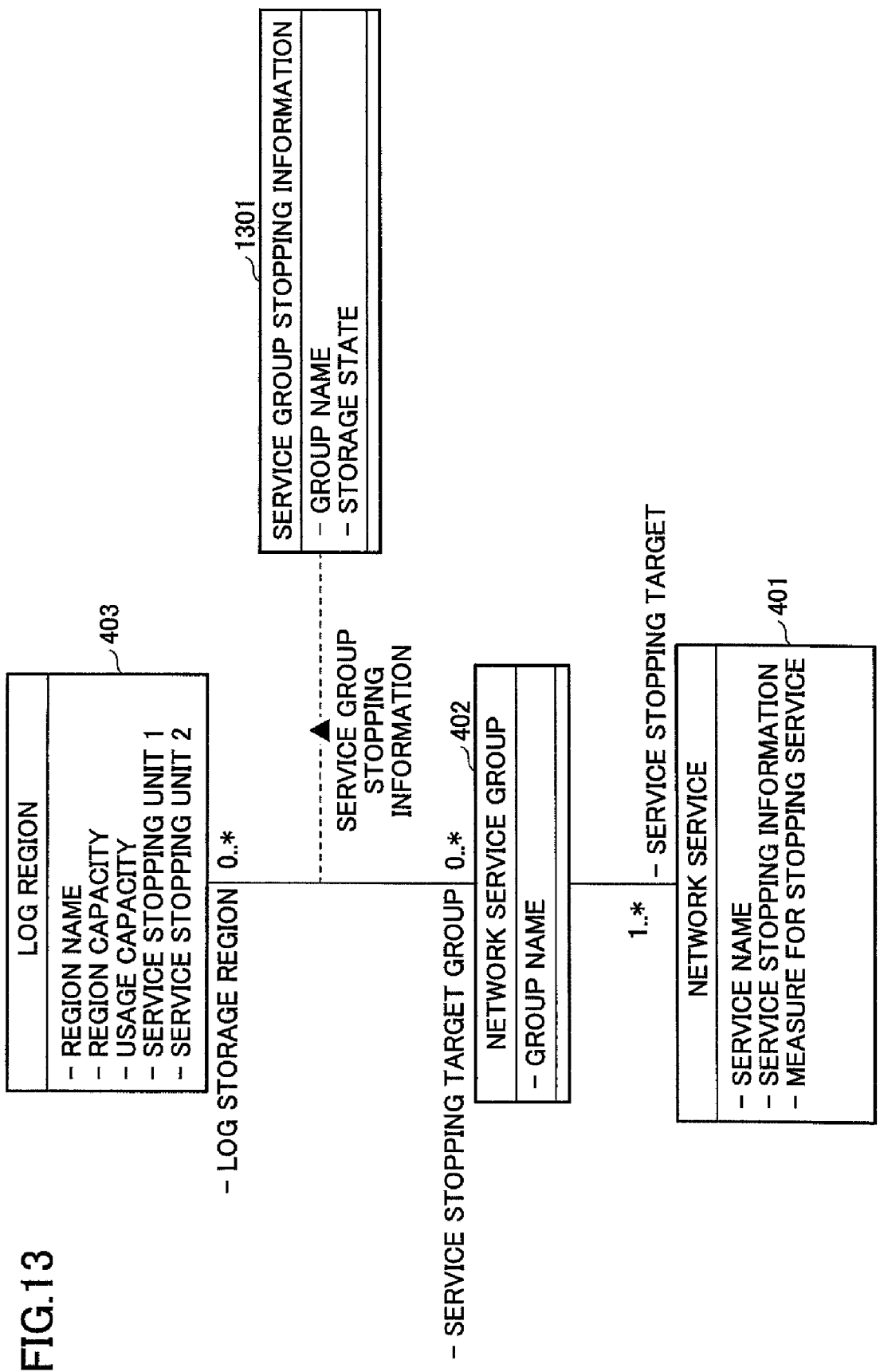
FIG. 13 is a class diagram indicating information held by a management table according to the first modification.

FIG. 13 is a class diagram indicating the information held by the management table according to the first modification. The difference between FIG. 4 and FIG. 13 is that in FIG. 13, service group stopping information 1301 is included. The service group stopping information 1301 is illustrated in FIG. 12. The stopping unit 303 refers to the service group stopping information 1301 when the storage region of the encrypted communications system log has become log-full or near-full.

Accordingly, when the storage region of the encrypted communications system log has become nearly full (near-full state), some of the network services are stopped before the storage region becomes completely full, so that specific functions can be used until the storage region of the encrypted communications system log becomes full. For example, this is effective in a case where the printer function is required to be used longer than the other functions.

(Second Modification)

A description is given of an image forming apparatus according to a second modification. In the second modification, the service stopping information in the management table 208 is automatically set based on statistical information of network service usage from the past. FIG. 14 is a block diagram of a main functional configuration of an image forming apparatus according to the second modification. The difference between FIG. 2 and FIG. 14 is that in FIG. 14, a service stopping information specifying unit 1401 is included in the network module 207. In the configuration shown in FIG. 14, elements corresponding to those in FIG. 2 are denoted by the same reference numbers, and are not further described.

The service stopping information specifying unit 1401 automatically specifies service stopping information based on statistical information of network service usage from the past. Specifically, the service stopping information specifying unit 1401 checks the usage frequency of each network protocol within a predetermined period of time, specifies some of the most frequently used network protocols as log-full, and specifies the other network protocols as near-full. The service stopping information may be similarly specified based on the amount of packets received for each network protocol.

As described above, the service stopping information can be automatically specified based on statistical information of network service usage from the past, and therefore the user does not need to specify the service stopping information.

Furthermore, in the second modification, a frequently-used network service is stopped in a log-full state; however, the service may be stopped in a near-full state. By stopping the services that are frequently stored in the log storage region, the other functions can be used longer. The user can determine whether to stop a frequently-used network service in a log-full state or a near-full state.

The present invention is not limited to the specifically disclosed embodiment, and variations and modifications may be made without departing from the scope of the present invention.

The process according to any one of the first embodiment and the first and second modifications may be described as a program, and the program may be executed by a computer so that the image forming apparatus can perform the above-described process. Furthermore, such a program may be recorded in a recording medium, and the recording medium recording the program may be read by a computer, so that the image forming apparatus can perform the above-described process.

Furthermore, the image forming apparatus may be constituted by combining the first embodiment with the first modification and/or the second modification. When the first modification is combined with the first embodiment, there are plural conditions for stopping the service for each network service. In this case, the service can be stopped when an instruction for stopping the service is given for the first time.

The present application is based on Japanese Priority Patent Application No. 2008-160670, filed on Jun. 19, 2008, the entire contents of which are hereby incorporated herein by reference.

What is claimed is:

1. An image forming apparatus for performing functions, comprising:
   a storage region configured to store logs of network services that execute the functions, wherein the storage region is divided into plural function segments each corresponding to one of the functions;
   a managing unit configured to manage the logs in groups formed by grouping together the network services in terms of the corresponding functions;
   a recording unit configured to record the logs of the network services into each of the function segments in the storage region according to the corresponding functions; and
   a stopping unit configured to stop the network services in terms of the groups managed by the managing unit, based on storage state information indicating an available space in each of the function segments in the storage region, wherein:
   the stopping unit stops each specific network service of the network services based on service stopping information specified for said each specific network service, and the storage state information, and
   the service stopping information comprises a log-full state indicating that the function segment in the storage region is fully recorded, and a near-full state indicating that a proportion of the function segment in the storage region including the recorded logs is greater than or equal to a predetermined value.

2. The image forming apparatus according to claim 1, wherein:
   the stopping unit stops one of the network services by causing the one of the network services to stand by, and records request information pertaining to the network service that is caused to stand by.

3. The image forming apparatus according to claim 2, further comprising:
   a network continuation unit configured to continue a connection with a network in the event that the stopping unit causes the network service to stand by.

4. The image forming apparatus according to claim 1, further comprising:
   a specifying unit configured to specify the service stopping information based on statistical information regarding usage of the network service.

5. The image forming apparatus according to claim 4, wherein:
   the statistical information is usage frequency of each network protocol within a predetermined time period or amount of packets received for each protocol within the predetermined time period.

6. An image forming apparatus for performing functions, wherein the functions comprise a predetermined function that is executed together with the other functions, the image forming apparatus comprising:
   a storage region configured to store logs of network services that execute the functions, wherein the storage region is divided into plural function segments each corresponding to one of the functions;
   a managing unit configured to manage the logs in groups formed by grouping together the network services in terms of the corresponding functions;
   a recording unit configured to record the logs of the network services into each of the function segments in the storage region according to the corresponding functions; and
   a stopping unit configured to stop the network services in terms of the groups managed by the managing unit, based on storage state information indicating an available space in the function segment corresponding to the predetermined function in the storage region.

7. The image forming apparatus according to claim 6, wherein the predetermined function is an encrypted communication.

8. A log control method of an image forming apparatus for performing functions, the image forming apparatus comprising a storage region configured to store logs of network services that execute the functions, wherein the storage region is divided into plural function segments each corresponding to one of the functions, and a managing unit configured to manage the logs in groups formed by grouping together the network services in terms of the corresponding functions, the log control method comprising:
   a recording step of recording the logs of the network services into each of the function segments in the storage region according to the corresponding functions; and
   a stopping step of stopping the network services in terms of the groups managed by the managing unit, based on storage state information indicating an available space in each of the function segments in the storage region, wherein
   the stopping step further comprises stopping each specific network service of the network services based on service stopping information specified for said each specific network service, and the storage state information, and
   the service stopping information comprises a log-full state indicating that the function segment in the storage region is fully recorded, and a near-full state indicating that a proportion of the function segment in the storage region including the recorded logs is greater than or equal to a predetermined value.

9. The log control method according to claim 8, wherein:
   the stopping step further comprises a step of stopping one of the network services by causing the one of the network services to stand by, and recording request information pertaining to the network service that is caused to stand by.

10. A program product comprising instructions, embodied in a non-transitory medium, for causing a computer to perform the log control method according to claim 8.

* * * * *